(12) United States Patent
Okada et al.

(10) Patent No.: US 12,334,561 B2
(45) Date of Patent: Jun. 17, 2025

(54) LITHIUM METAL NEGATIVE ELECTRODE AND METHOD OF MANUFACTURING THE SAME

(71) Applicant: GM GLOBAL TECHNOLOGY OPERATIONS LLC, Detroit, MI (US)

(72) Inventors: Kanako Okada, Royal Oak, MI (US); Jesse M. Roy, Madison Heights, MI (US); Li Yang, Troy, MI (US); Mary E. Fortier, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 467 days.

(21) Appl. No.: 17/525,096

(22) Filed: Nov. 12, 2021

(65) Prior Publication Data
US 2023/0155133 A1 May 18, 2023

(51) Int. Cl.
| | |
|---|---|
| *H01M 4/62* | (2006.01) |
| *H01M 4/04* | (2006.01) |
| *H01M 4/134* | (2010.01) |
| *H01M 4/1395* | (2010.01) |
| *H01M 4/505* | (2010.01) |

(Continued)

(52) U.S. Cl.
CPC ......... *H01M 4/628* (2013.01); *H01M 4/0402* (2013.01); *H01M 4/134* (2013.01); *H01M 4/1395* (2013.01); *H01M 4/505* (2013.01); *H01M 4/525* (2013.01); *H01M 10/052* (2013.01); *H01M 2300/0025* (2013.01)

(58) Field of Classification Search
CPC .... H01M 4/628; H01M 4/0402; H01M 4/134; H01M 4/1395; H01M 4/505; H01M 10/052; H01M 4/525
See application file for complete search history.

(56) References Cited

U.S. PATENT DOCUMENTS

| | | | | |
|---|---|---|---|---|
| 2006/0019167 A1* | 1/2006 | Li | ..................... | H01M 10/0561 429/188 |
| 2016/0172681 A1* | 6/2016 | Yang | ................... | H01M 4/0452 429/188 |
| 2017/0288230 A1* | 10/2017 | Yang | ..................... | H01M 4/381 |

(Continued)

FOREIGN PATENT DOCUMENTS

| | | |
|---|---|---|
| CN | 116130609 A | 5/2023 |
| DE | 102022123705 A1 | 5/2023 |

OTHER PUBLICATIONS

Gao et al. ACS Appl. Mater. Interfaces 2020, 12, 844-850 (Year: 2020).*

(Continued)

*Primary Examiner* — Alexander Usyatinsky
(74) *Attorney, Agent, or Firm* — Harness, Dickey & Pierce, P.L.C.

(57) ABSTRACT

A negative electrode for an electrochemical cell of a secondary lithium metal battery is manufactured by a method in which a precursor solution is applied to a major surface of a lithium metal substrate to form a protective interfacial layer thereon. The precursor solution includes a first organic solvent mixture, a dioxolane, and a fluorinated organosilane. The protective interfacial layer exhibits a composite structure including a polymeric matrix component and a lithium-containing dispersed component embedded in the polymeric matrix component.

15 Claims, 2 Drawing Sheets

(51) Int. Cl.
*H01M 4/525* (2010.01)
*H01M 10/052* (2010.01)

(56) References Cited

U.S. PATENT DOCUMENTS

2018/0138547 A1* 5/2018 Kim .................. H01M 10/0569
2018/0151887 A1* 5/2018 Yang .................... H01M 4/366

OTHER PUBLICATIONS

Boyle, D.T., Huang, W., Wang, H et al., Corrosion of lithium metal anodes during calendar ageing and its microscopic origins, Nature Energy, vol. 6, pp. 487-494 (Mar. 22, 2021). https://doi.org/10.1038/s41560-021-00787-9.

* cited by examiner

LITHIUM METAL NEGATIVE ELECTRODE AND METHOD OF MANUFACTURING THE SAME

INTRODUCTION

The present invention relates to lithium metal batteries and, more particularly, to interfacial coatings for lithium metal negative electrodes.

Lithium metal is a desirable negative electrode material for secondary lithium metal batteries due to its high specific capacity (3,860 mAh/g) and low reduction potential (−3.04 V versus the standard hydrogen electrode). In a lithium metal battery, elemental lithium metal is plated on and stripped from a surface of a negative electrode current collector during charging and discharge of the battery, causing the negative electrode to experience large volumetric changes during cycling of the battery. Due to the low reduction potential of lithium metal, redox reactions may inherently occur at an interface between the lithium metal negative electrode and the organic liquid electrolyte, for example, during initial charging of the battery, which may result in the in-situ formation of an electrically insulating and ionically conductive layer referred to as a solid electrolyte interphase (SEI) on the surface of the lithium metal negative electrode.

Formation of a native SEI on the surface of the lithium metal negative electrode may prevent direct exposure of the organic liquid electrolyte to the lithium metal surface and may help promote uniform plating and stripping of lithium ions at the negative electrode during battery cycling, which may help prevent lithium dendrite nucleation and growth. However, the mechanical stability and flexibility of inherently formed native SEI layers may be inadequate to compensate for the large volumetric changes experienced by lithium metal negative electrodes during repeated cycling of the battery. Cracks or damage to the SEI layer over the life of the battery may result in repeated direct exposures of the organic liquid electrolyte to the lithium metal negative electrode, formation of additional SEI material, and further decomposition of the liquid electrolyte and consumption of active lithium.

It may be desirable to develop a method that can be used to form an electrically insulating and ionically conductive layer on the surface of a lithium metal negative electrode that exhibits good mechanical stability and flexibility and can inhibit the occurrence of undesirable side reactions between the lithium metal of the negative electrode and the liquid electrolyte during initial charging and over the life of the battery.

SUMMARY

In a method of manufacturing a negative electrode for an electrochemical cell of a secondary lithium metal battery, a precursor solution is applied to a major surface of a lithium metal substrate to form a protective interfacial layer thereon. The precursor solution includes an organic solvent mixture, a dioxolane, and a fluorinated organosilane. The protective interfacial layer exhibits a composite structure including a polymeric matrix component and a lithium-containing dispersed component embedded in the polymeric matrix component.

The dioxolane may be a chemical compound that contains a dioxolane ring.

The dioxolane may be 1,3-dioxolane.

The dioxolane may be included in the precursor solution in an amount constituting, by weight, 1% to 60% of the precursor solution.

The fluorinated organosilane may be a chemical compound having the formula: $R'R''_nSiX_{4-n}$, wherein n=0, 1, or 2, and wherein R' is a polyfluorinated C1-C8 alkyl group, R" is a methyl group, and X is a methoxy group or a chlorine atom.

The fluorinated organosilane may be at least one of (3,3,3-trifluoropropylmethyl)dimethoxysilane, (3,3,3-Trifluoropropyl)trimethoxysilane, 1H,1H,2H,2H-perfluorooctylmethyldimethoxysilane, 1H,1H,2H,2H-perfluorooctyltrimethoxysilane, 1H,1H,2H,2H-perfluorooctyldimethylchlorosilane, 1H,1H,2H,2H-perfluorooctylmethyldichlorosilane, (1H,1H,2H,2H-perfluoro-n-hexyl)methyldichlorosilane, or 1H,1H,2H,2H-perfluorooctyltrichlorosilane.

The fluorinated organosilane may be included in the precursor solution in an amount constituting, by weight, 1% to 10% of the precursor solution.

The organic solvent mixture may comprise a mixture of an acyclic ether and a cyclic ether.

The organic solvent mixture may comprise a mixture of 1,2-dimethoxyethane and tetrahydrofuran.

The polymeric matrix component may be chemically bonded to the major surface of the lithium metal substrate via a plurality of silicon-oxygen bonds and/or alkoxide bonds.

The polymeric matrix component may comprise a plurality of siloxane bonds.

The lithium-containing dispersed component may comprise lithium fluoride.

The method may further comprise removing unreacted dioxolane compounds, fluorinated organosilane compounds, and/or mobile reaction byproducts from the protective interfacial layer.

The unreacted dioxolane compounds, fluorinated organosilane compounds, and/or mobile reaction byproducts may be removed from the protective interfacial layer by washing the protective interfacial layer with a nonpolar organic solvent.

In another method of manufacturing a negative electrode for an electrochemical cell of a secondary lithium metal battery, a continuous lithium metal layer is formed on a major surface of a metal substrate. A precursor solution is applied to a major facing surface of the continuous lithium metal layer to form a protective interfacial layer directly on the major facing surface of the continuous lithium metal layer. The precursor solution includes an organic solvent mixture, a dioxolane, and a fluorinated organosilane. The protective interfacial layer exhibits a composite structure including a polymeric matrix component and a lithium-containing dispersed component embedded in the polymeric matrix component. The polymeric matrix component is chemically bonded to the major facing surface of the continuous lithium metal layer via a plurality of silicon-oxygen bonds and/or alkoxide bonds.

The polymeric matrix component may comprise a plurality of siloxane bonds, and the lithium-containing dispersed component may comprise lithium fluoride.

The precursor solution may be applied to the major facing surface of the continuous lithium metal layer by immersing the metal substrate in the precursor solution.

An electrochemical cell of a lithium metal battery is disclosed. The electrochemical cell comprises a positive electrode, a lithium metal negative electrode spaced apart from the positive electrode, and a nonaqueous liquid electrolyte in ionic contact with the positive electrode and the lithium metal negative electrode. The positive electrode includes a transition metal oxide that can undergo a reversible intercalation of lithium ions. The lithium metal negative electrode includes a lithium metal layer disposed on a negative electrode current collector. The lithium metal layer has a major facing surface that faces toward the positive electrode. A protective interfacial layer is formed directly on the major facing surface of the lithium metal layer, along an interface between the lithium metal negative electrode and the nonaqueous liquid electrolyte. The protective interfacial layer exhibits a composite structure including a polymeric matrix component and a lithium-containing dispersed component embedded in the polymeric matrix component. The polymeric matrix component is chemically bonded to the lithium metal layer via a plurality of silicon-oxygen bonds and/or alkoxide bonds.

The lithium metal layer may comprise, by weight, greater than 97% lithium.

The transition metal oxide of the positive electrode may be a high-nickel content lithium nickel cobalt manganese oxide having the chemical formula: $LiNi_{1-a-b}Co_aMn_bO_2$, wherein a=0.1-0.2 and b=0.1-0.2.

The nonaqueous liquid electrolyte may comprise a nonaqueous aprotic organic solvent and a lithium salt dissolved in the nonaqueous aprotic organic solvent.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

Illustrative embodiments will hereinafter be described in conjunction with the appended drawings, wherein like designations denote like elements, and wherein.

Figure 1:
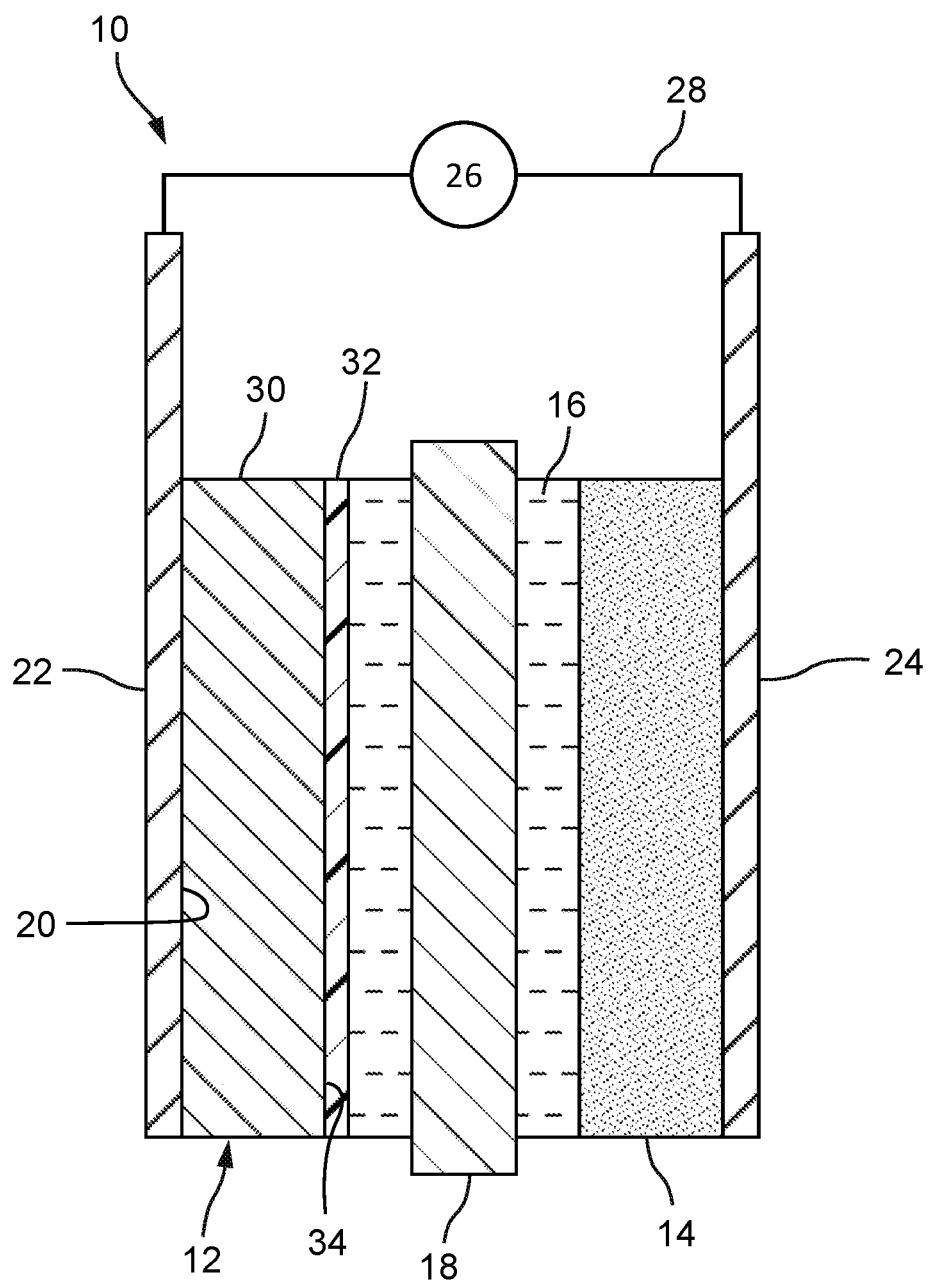
FIG. 1 is a schematic side cross-sectional view of an electrochemical cell including a negative electrode, a positive electrode, and a liquid electrolyte in ionic contact with the negative and positive electrodes, wherein the negative electrode includes a lithium metal layer disposed on a major surface of a negative electrode current collector and a protective interfacial layer formed directly on a major facing surface of the lithium metal layer.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

The presently disclosed methods may be used to form an ionically conductive and electrically insulating protective interfacial layer on a major facing surface of a lithium metal negative electrode prior to incorporating the lithium metal negative electrode into an electrochemical cell of a lithium metal battery. The resulting protective interfacial layer exhibits exceptional flexibility and mechanical stability and effectively accommodates volumetric changes experienced by the lithium metal negative electrode during cycling of the lithium metal battery. Formation of the presently disclosed protective interfacial layer is performed ex situ and does not result in decomposition of the liquid electrolyte or consumption of active lithium metal.

FIG. 1 depicts a schematic side cross-sectional view of an electrochemical cell 10 that may be combined with one or more additional electrochemical cells to form a secondary lithium battery, such as a lithium metal battery (not shown). The electrochemical cell 10 includes a negative electrode 12, a positive electrode 14 spaced apart from the negative electrode 12, a nonaqueous liquid electrolyte 16 that provides a medium for the conduction of lithium ions between the negative electrode 12 and the positive electrode 14, and a porous separator 18 that electrically isolates the negative and positive electrodes 12, 14 from each other while allowing lithium ions to pass therethrough. The negative electrode 12 is disposed on a major surface 20 of a negative electrode current collector 22 and the positive electrode 14 is disposed on a major surface of a positive electrode current collector 24. In practice, the negative and positive electrode current collectors 22, 24 may be electrically coupled to a power source or load 26 via an external circuit 28.

The negative electrode 12 includes an electrochemically active material layer in the form of a lithium metal layer 30 disposed on the major surface 20 of the negative electrode current collector 22 and a protective interfacial layer 32 formed on a major facing surface 34 of the lithium metal layer 30.

The lithium metal layer 30 may be disposed directly or indirectly on the major surface 20 of the negative electrode current collector 22. The lithium metal layer 30 may comprise a lithium metal alloy or may consist essentially of lithium (Li) metal. For example, the lithium metal layer 30 may comprise, by weight, greater than 97% lithium or, more preferably, greater than 99% lithium. The lithium metal layer 30 preferably does not comprise any other elements or compounds that undergo a reversible redox reaction with lithium during operation of the electrochemical cell 10. For example, the lithium metal layer 30 preferably does not comprise an intercalation host material that is formulated to undergo the reversible insertion or intercalation of lithium ions or an alloying material that can electrochemically alloy and form compound phases with lithium. In addition, the lithium metal layer 30 preferably does not comprise a conversion material or an alloy material that can electrochemically alloy and form compound phases with lithium. Some examples of materials that are preferably excluded from the lithium metal layer 30 include carbon-based materials (e.g., graphite, activated carbon, carbon black, and graphene), silicon and silicon-based materials, tin oxide, aluminum, indium, zinc, cadmium, lead, germanium, tin, antimony, titanium oxide, lithium titanium oxide, lithium titanate, lithium oxide, metal oxides (e.g., iron oxide, cobalt oxide, manganese oxide, copper oxide, nickel oxide, chromium oxide, ruthenium oxide, and/or molybdenum oxide), metal phosphides, metal sulfides, and metal nitrides (e.g., phosphides, sulfides, and/or nitrides or iron, manganese, nickel, copper, and/or cobalt). The lithium metal layer 30 does not comprise a polymeric binder. Some examples of polymeric binders that are preferably excluded from the lithium metal layer 30 include polyvinylidene fluoride (PVdF), ethylene propylene diene monomer (EPDM) rubber, styrene butadiene rubber (SBR), carboxymethyl cellulose (CMC), and polyacrylic acid. The lithium metal layer 30 may have a thickness in a range of greater than zero micrometers and less than or equal to 100 micrometers, depending upon the state of charge of the electrochemical cell 10.

The lithium metal layer 30 may have a thickness in a range of 0.1 micrometers to 100 micrometers.

The protective interfacial layer 32 creates an electrically insulating and ionically conductive interface between the lithium metal layer 30 and the nonaqueous liquid electrolyte 16 within the electrochemical cell 10 that is configured to improve the coulombic efficiency and cycling stability thereof, for example, by promoting the uniform plating and stripping of Li$^+$ ions on the negative electrode current collector 22 and inhibiting undesirable parasitic side reactions between the lithium metal layer 30 and the nonaqueous liquid electrolyte 16. The protective interfacial layer 32 is formed directly on the major facing surface 34 of the lithium metal layer 30 and is configured to prevent direct contact between the lithium metal layer 30 and the nonaqueous liquid electrolyte 16 during storage of the electrochemical cell 10 and during operation thereof.

The protective interfacial layer 32 may exhibit an organic-inorganic composite structure that includes a polymeric matrix component and an inorganic lithium-containing dispersed component embedded in the polymeric matrix component.

The polymeric matrix component may be substantially amorphous and may include a plurality of organic compounds chemically bonded to the major facing surface 34 of the lithium metal layer 30 via silicon-oxygen (—Si—O—Li) bonds or alkoxide bonds (R—O—Li), wherein R may be a C1-C6 alkyl group. In aspects, at least some of the organic compounds bonded to the major facing surface 34 of the lithium metal layer 30 by via silicon-oxygen bonds may be represented by the chemical formula: R—Si—O—Li, wherein R may be a polyfluorinated or perfluorinated C3-C8 alkyl group. For example, in aspects, at least some of the organic compounds bonded to the major facing surface 34 of the lithium metal layer 30 may be represented by the chemical formula: R—Si—O—Li, wherein R is one or more of —CH$_2$CH$_2$CF$_3$; —CH$_2$CH$_2$(CF$_2$)$_3$CF$_3$; or —CH$_2$CH$_2$(CF$_2$)$_5$CF$_3$. Without intending to be bound by theory, it is believed that the perfluoroalkyl moieties (—CF$_2$—) and the trifluoromethyl terminal groups (—CF$_3$) in the polymeric matrix component of the protective interfacial layer 32 may help improve the transport of Li$^+$ ions through the protective interfacial layer 32 during cycling of the electrochemical cell 10.

The polymeric matrix component may include a plurality of interconnected siloxane bonds (—Si—O—Si—), which may provide the protective interfacial layer 32 with improved mechanical stability and flexibility, as compared to native SEI layers that might otherwise inherently form in situ on the lithium metal layer 30 due to parasitic reactions between the lithium metal layer 30 and the nonaqueous liquid electrolyte 16.

The inorganic lithium-containing dispersed component may include one or more lithium-containing inorganic ionic compounds embedded in and encapsulated by the polymeric matrix component. The lithium-containing inorganic ionic compounds may comprise compounds of lithium fluoride (LiF).

The protective interfacial layer 32 may exhibit a thickness in the range of 10 nanometers to 5 micrometers.

The protective interfacial layer 32 may exhibit a porosity of up to 60%.

The positive electrode 14 is porous and may comprise one or more electrochemically active materials that can undergo a reversible redox reaction with lithium, e.g., a material that can sufficiently undergo lithium intercalation and deintercalation, alloying and dealloying, or plating and stripping. In one form, the positive electrode 14 may comprise an intercalation host material that can undergo the reversible insertion or intercalation of lithium ions. In such case, the intercalation host material of the positive electrode 14 may comprise a layered oxide represented by the formula LiMeO$_2$, an olivine-type oxide represented by the formula LiMePO$_4$, a spinel-type oxide represented by the formula LiMe$_2$O$_4$, a tavorite represented by one or both of the following formulas LiMeSO$_4$F or LiMePO$_4$F, or a combination thereof, where Me is a transition metal (e.g., Co, Ni, Mn, Fe, Al, V, or a combination thereof). In another form, the positive electrode 14 may comprise a conversion material including a component that can undergo a reversible electrochemical reaction with lithium, in which the component undergoes a phase change or a change in crystalline structure accompanied by a change in oxidation state. In such case, the conversion material of the positive electrode 14 may comprise sulfur, selenium, tellurium, iodine, a halide (e.g., a fluoride or chloride), sulfide, selenide, telluride, iodide, phosphide, nitride, oxide, oxysulfide, oxyfluoride, sulfur-fluoride, sulfur-oxyfluoride, or a lithium and/or metal compound thereof. Examples of suitable metals for inclusion in the conversion material of the positive electrode 14 include iron, manganese, nickel, copper, and cobalt.

In aspects, the positive electrode 14 may include an electrochemically active material in the form of a layered high-nickel content lithium nickel cobalt manganese oxide (LiNiCoMnO$_2$ or NCM). In such case, the nickel (Ni), cobalt (Co), and manganese (Mn) may be present in the electrochemically active material at a ratio of 3-9.5:0-3:0.5-3, or in a range of 6-8:1-2:1-2.

The electrochemically active material of the positive electrode 14 may be intermingled with a polymeric binder to provide the positive electrode 14 with structural integrity. Examples of polymeric binders include polyvinylidene fluoride (PVdF), ethylene propylene diene monomer (EPDM) rubber, styrene butadiene rubber (SBR), carboxymethyl cellulose (CMC), polyacrylic acid, and mixtures thereof. The positive electrode 14 optionally may include particles of an electrically conductive material, which may comprise very fine particles of, for example, high-surface area carbon black.

The nonaqueous liquid electrolyte 16 is ionically conductive and provides an ionically conductive pathway for the transfer of lithium ions between the negative and positive electrodes 12, 14. In assembly, the electrochemical cell 10 may be infiltrated with the nonaqueous liquid electrolyte 16 such that the lithium metal layer 30 and the positive electrode 14 are in physical contact with, e.g., by being wet with, the nonaqueous liquid electrolyte 16. The nonaqueous liquid electrolyte 16 may be in the form of a nonaqueous liquid electrolyte solution, a gel electrolyte, or a solid electrolyte. When the nonaqueous liquid electrolyte 16 is in the form of a nonaqueous liquid electrolyte solution, the nonaqueous liquid electrolyte 16 may comprise a lithium salt dissolved or ionized in a nonaqueous, aprotic organic solvent or a mixture of nonaqueous, aprotic organic solvents. Examples of lithium salts include $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $Li_2CO_3$, $LiPF_6$, and combinations thereof. Examples of nonaqueous, aprotic organic solvents include cyclic carbonates (i.e., ethylene carbonate, propylene carbonate), acyclic carbonates (i.e., dimethyl carbonate, diethyl carbonate, ethyl methyl carbonate), aliphatic carboxylic esters (i.e., methyl formate, methyl acetate, methyl propionate), γ-lactones (i.e., γ-butyrolactone, γ-valerolactone), acyclic ethers (i.e., 1,2-dimethoxyethane, 1,2-diethoxyethane, ethoxymethoxyethane), and/or cyclic ethers (i.e., tetrahydrofuran, 2-methyltetrahydrofuran). When the nonaqueous liquid electrolyte 16 is in the form of a gel or plasticized polymer electrolyte, the nonaqueous liquid electrolyte 16 may comprise a polymer host material soaked with a nonaqueous liquid electrolyte solution. Examples of polymer host materials include poly(vinylidene) (PVdF), poly(acrylonitrile) (PAN), poly (methyl methacrylate) (PMMA), poly(ethylene oxide) (PEO), polyacrylates, and poly(vinylidene fluoride-hexafluoropropylene) (PVdF-HFP).

The porous separator 18 is configured to physically separate the negative and positive electrodes 12, 14 from one another while permitting lithium ions to pass therethrough. The porous separator 18 exhibits an open microporous structure and may comprise an organic and/or inorganic material. The porous separator 18 may comprise a nonwoven material, e.g., a manufactured sheet, web, or mat of directionally or randomly oriented fibers. The porous separator 18 may comprise a microporous polymeric material, e.g., a microporous polyolefin-based membrane or film. For example, the porous separator 18 may comprise a single polyolefin or a combination of polyolefins, such as polyethylene (PE), polypropylene (PP), polyamide (PA), poly(tetrafluoroethylene) (PTFE), polyvinylidene fluoride (PVdF), and/or poly(vinyl chloride) (PVC). In one form, the porous separator 18 may comprise a laminate of one or more polymeric materials, such as a laminate of PE and PP. The porous separator 18 may include a ceramic coating layer (not shown). The ceramic coating layer may be disposed on one or both sides of the porous separator 18 and may have a thickness in a range of 1 micrometer to 20 micrometers. The material forming the ceramic coating layer may be selected from the group consisting of: alumina ($Al_2O_3$), silica ($SiO_2$), and combinations thereof.

The negative and positive electrode current collectors 22, 24 may be in the form of thin and flexible porous or non-porous electrically conductive metal substrates. The term "metal," as used herein, refers to materials made of a single elemental metal, as well as materials made of a mixture of two or more elements, wherein at least one of the elements is a metal. The other element(s) can be a non-metal or a different metal. In aspects, the negative electrode current collector 22 may comprise copper (Cu), nickel (Ni), an iron (Fe) alloy (e.g., stainless steel), or titanium (Ti). Other electrically conductive metals may of course be used, if desired.

Figure 2:
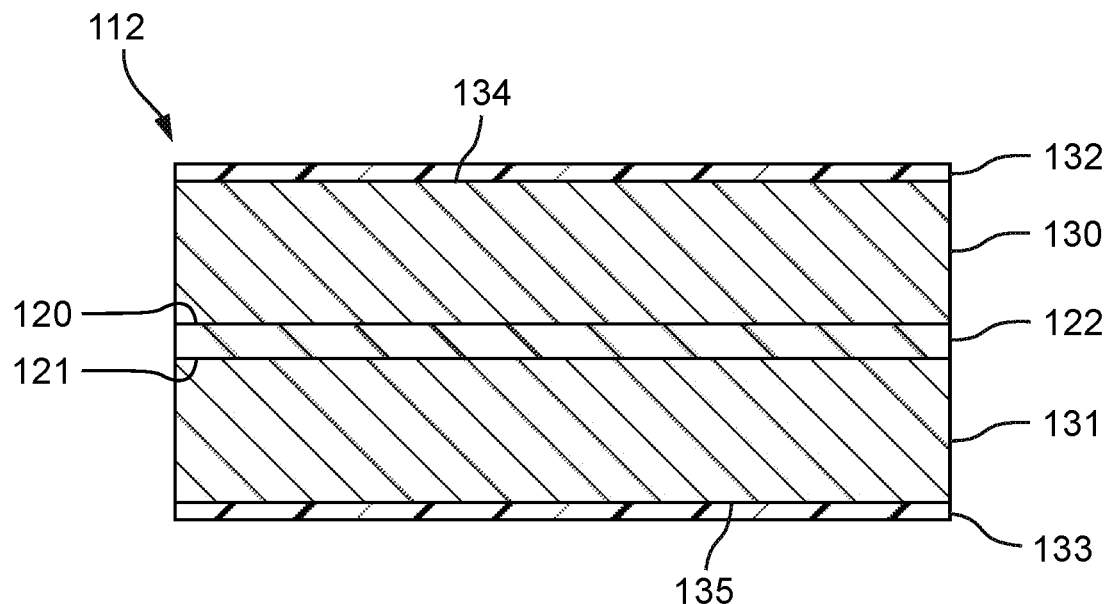
FIG. 2 is a schematic side cross-sectional view of a double-sided negative electrode, including a negative electrode current collector having first and second lithium metal layers disposed on opposite first and second sides thereof and first and second protective interfacial layers formed on major facing surfaces of the first and second lithium metal layers.
Figure 3:
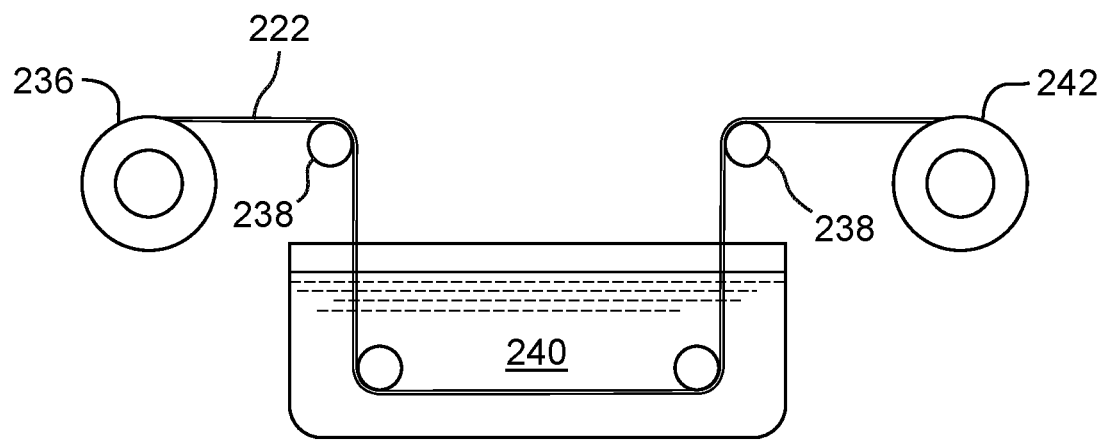
FIG. 3 is a schematic side cross-sectional view of an apparatus for manufacturing the double-sided negative electrode of FIG. 2.

Referring now to FIGS. 2 and 3, a double-sided negative electrode 112 may be manufactured using a continuous roll-to-roll process. The double-sided negative electrode 112 depicted in FIG. 2 is similar in many respects to the negative electrode 12 described above with respect to FIG. 1 and description of common subject matter may not be repeated here.

The double-sided negative electrode 112 includes a negative electrode current collector 122 having a first major surface 120 and an opposite second major surface 121. A first lithium metal layer 130 is disposed on the first major surface 120 of the negative electrode current collector 122 and a second lithium metal layer 131 is disposed on the second major surface 121 of the negative electrode current collector 122. A first protective interfacial layer 132 is formed on a major facing surface 134 of the first lithium metal layer 130 and a second protective interfacial layer 133 is formed on a major facing surface 135 of the second lithium metal layer 131.

As shown in FIG. 3, in a method of manufacturing the double-sided negative electrode 112, a metal substrate 222 having a first major surface and an opposite second major surface may be provided. The metal substrate 222 includes a first lithium metal layer (not shown) disposed on the first major surface thereof and a second lithium metal layer (not shown) disposed on the second major surface thereof. The metal substrate 222 may be in the form of a thin continuous metal foil and may be wound on a first spool 236 during storage. During the manufacturing process, the metal substrate 222 may be unwound from the first spool 236 and transported via a plurality of rollers 238.

A first protective interfacial layer (not shown) may be formed on a major facing surface of the first lithium metal layer and a second protective interfacial layer (not shown) may be formed on a major facing surface of the second lithium metal layer, over the metal substrate 222 by applying a precursor solution 240 to the major facing surfaces of the first and second lithium metal layers. For example, as shown in FIG. 3, the precursor solution 240 may be applied to the major facing surfaces of the first and second lithium metal layers by immersing the metal substrate 222 in a volume of the precursor solution 240. After formation of the first and second protective interfacial layers, the metal substrate 222 may be removed from the precursor solution and rewound onto a second spool 242, for example, for storage and/or transportation thereof. In aspects, after formation of the first and second protective interfacial layers, the metal substrate 222 may be washed to remove residual reactants and/or mobile reaction byproducts from the first and second protective interfacial layers. The metal substrate 222, including the first and second lithium metal layers and the overlying first and second protective interfacial layers, may be cut into segments of a desired length and used as double-sided negative electrodes in a secondary lithium metal battery.

The precursor solution used to form the first and second protective interfacial layers may include a dioxolane and a fluorinated organosilane dissolved or dispersed in a nonpolar organic solvent. The dioxolane and the fluorinated organosilane in the precursor solution are formulated to react with hydroxyl groups (—OH) groups attached to the lithium metal on the major facing surfaces of the lithium metal layers to form a chemical and physical bond therewith.

The dioxolane is formulated to react with the lithium metal layers to form a plurality of organic compounds that are chemically bonded to the lithium metal layers via alkoxide bonds (R—O—Li), wherein R may be a C1-C6 alkyl group or alkoxy group. The dioxolane is a chemical compound that contains a dioxolane ring, i.e., a 5-membered heterocyclic compound with the chemical formula $(CR_2)_2O_2CR_2$, wherein R may be the same or different and may comprise hydrogen (H), oxygen (=O), or an organofunctional group. Example organofunctional groups include alkyl groups and alkoxy groups. For example, the dioxolane may comprise 1,3-dioxolane; 4,5-diethyl-dioxolane; 4,5-dimethyl-dioxolane; 4-methyl-1,3-dioxolane; and/or 4-ethyl-1,3-dioxolane. In aspects, the dioxolane may consist essentially of 1,3-dioxolane.

The dioxolane may be included in the precursor solution in an amount constituting, by weight, 1% to 60% of the precursor solution, or 10% to 50% of the precursor solution.

The fluorinated organosilane is formulated to react with the lithium metal layers to form a plurality of organofunctional compounds that are chemically bonded to the lithium metal layers via silicon-oxygen (—Si—O—Li) bonds. The fluorinated organosilane may be a fluorinated methoxysilane or a fluorinated chlorosilane. The fluorinated organosilane may have the following chemical formula: R'R"$_n$SiX$_{4-n}$, wherein n=0, 1, or 2, and wherein R' is a polyfluorinated or perfluorinated C1-C8 alkyl group, R" is a methyl group (—CH$_3$), and X is a hydrolysable group. In aspects, R' may be —CH$_2$CH$_2$CF$_3$; —CH$_2$CH$_2$(CF$_2$)$_3$CF$_3$; or —CH$_2$CH$_2$(CF$_2$)$_5$CF$_3$ and X may be an alkoxy group (e.g., a methoxy group (—OCH$_3$) or a chlorine atom (C). For example, the fluorinated organosilane may comprise (3,3,3-trifluoropropylmethyl)dimethoxysilane (CAS No. 358-67-8); (3,3,3-trifluoropropyl)trimethoxysilane (CAS No. 429-60-7); 1H,1H,2H,2H-perfluorooctylmethyldimethoxysilane, 1H,1H,2H,2H-perfluorooctyltrimethoxysilane (CAS No. 85857-17-6); 1H,1H,2H,2H-perfluorooctyldimethylchlorosilane (CAS No. 102488-47-1); 1H,1H,2H,2H-perfluorooctylmethyldichlorosilane (CAS No. 73609-36-6); (1H, 1H,2H,2H-perfluoro-n-hexyl)methyldichlorosilane (CAS No. 38436-16-7); and/or 1H,1H,2H,2H-perfluorooctyltrichlorosilane (CAS No. 78560-45-9).

The fluorinated organosilane may be included in the precursor solution in an amount constituting, by weight, 1% to 10% of the precursor solution, or 2% to 5% of the precursor solution.

The nonpolar organic solvent may comprise a mixture of one or more nonpolar organic solvents. For example, the nonpolar organic solvent may comprise a mixture of an acyclic ether and a cyclic ether. The acyclic ether may comprise 1,2-dimethoxyethane (DME); 1,2-diethoxyethane; tetraethylene glycol dimethyl ether; and/or polyethylene glycol dimethyl ether. The cyclic ether may comprise tetrahydrofuran (TIF) and/or 2-methyltetrahydrofuran. In aspects, the nonpolar organic solvent may comprise a mixture of 1,2-dimethoxyethane and tetrahydrofuran. The 1,2-dimethoxyethane and tetrahydrofuran may be included in the nonpolar organic solvent at a volume ratio of 1:1.

After the first and second protective interfacial layers are formed on the metal substrate 222 and the metal substrate 222 is removed from the precursor solution, the first and second protective interfacial layers may be washed with an inert liquid to remove residual amounts of the dioxolane and the fluorinated organosilane therefrom, and/or to remove reaction byproducts not chemically bonded to or embedded in the structure of the first and second protective interfacial layers. The inert liquid may comprise a nonpolar organic solvent, e.g., 1,2-dimethoxyethane and/or tetrahydrofuran. Residual amounts of the nonpolar organic solvent and/or the inert liquid may be removed from the first and second protective interfacial layers, for example, by heating the first and second protective interfacial layers in an inert gas environment (e.g., argon, nitrogen and/or helium).

These and other benefits will be readily appreciated by those of ordinary skill in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A method of manufacturing a negative electrode for a secondary lithium metal battery, the method comprising:
applying a precursor solution to a major surface of a lithium metal substrate to form a protective interfacial layer thereon, the protective interfacial layer having a thickness in a range of 10 nanometers to 5 micrometers, a composite structure, and being chemically bonded to the lithium metal substrate via a plurality of silicon-oxygen bonds and alkoxide bonds, the composite structure including a polymeric matrix component and a lithium-containing dispersed component embedded in the polymeric matrix component, the polymeric matrix component comprising a plurality of siloxane bonds and the lithium-containing dispersed component comprising lithium fluoride,
wherein the precursor solution
applied to the major surface of the lithium metal substrate comprises an organic solvent, 10% to 50%, by weight, of a dioxolane, and 2% to 5%, by weight, of a fluorinated organosilane, the dioxolane being a chemical compound that contains a dioxolane ring, and the fluorinated organosilane having the formula: R'R"$_n$-SiX$_{4-n}$, wherein n=0, 1, or 2, and wherein R' is a polyfluorinated C$_1$-C$_8$ alkyl group having greater than or equal to 3 and less than or equal to 13 fluorine atoms, R" is H or a methyl group, and X is a methoxy group or a chlorine atom.

2. The method of claim 1 wherein the dioxolane is 1,3-dioxolane.

3. The method of claim 1 wherein the fluorinated organosilane is at least one of (3,3,3-trifluoropropylmethyl) dimethoxysilane, (3,3,3-Trifluoropropyl) trimethoxysilane, 1H,1H,2H,2H-perfluorooctylmethyldimethoxysilane, 1H, 1H,2H,2H-perfluorooctyltrimethoxysilane, 1H, 1H,2H,2H-perfluorooctyldimethylchlorosilane, perfluorooctylmethyldichlorosilane, 1H,1H,2H,2H- (1H,1H,2H,2H-perfluoro-n-hexyl) methyldichlorosilane, or 1H, 1H,2H,2H-perfluorooctyltrichlorosilane.

4. The method of claim 1 wherein the organic solvent mixture comprises a mixture of an acyclic ether and a cyclic ether, optionally wherein the organic solvent mixture comprises a mixture of 1,2-dimethoxyethane and tetrahydrofuran.

5. The method of claim 1 further comprising:
removing unreacted dioxolane compounds, fluorinated organosilane compounds, and/or mobile reaction byproducts from the protective interfacial layer,
optionally wherein the unreacted dioxolane compounds, fluorinated organosilane compounds, and/or mobile reaction byproducts are removed from the protective interfacial layer by washing the protective interfacial layer with a nonpolar organic solvent.

6. A lithium metal battery, comprising:

a positive electrode including a transition metal oxide that can undergo a reversible intercalation of lithium ions;

a lithium metal negative electrode spaced apart from the positive electrode, the lithium metal negative electrode including a lithium metal layer disposed on a negative electrode current collector, the lithium metal layer having a major facing surface that faces toward the positive electrode; a nonaqueous liquid electrolyte in ionic contact with the positive electrode and the lithium metal negative electrode; and a protective interfacial layer formed directly on the major facing surface of the lithium metal layer, along an interface between the lithium metal negative electrode and the nonaqueous liquid electrolyte, the protective interfacial layer having a thickness in a range of 10 nanometers to 5 micrometers, a composite structure, and being chemically bonded to the lithium metal layer via a plurality of silicon-oxygen bonds and alkoxide bonds, the composite structure including a polymeric matrix component and a lithium-containing dispersed component embedded in the polymeric matrix component, the polymeric matrix component comprising a plurality of siloxane bonds and the lithium-containing dispersed component comprising lithium fluoride, wherein the protective interfacial layer is formed on the major facing surface of the lithium metal layer prior to assembly of the lithium metal battery by applying a precursor solution to the lithium metal layer, the precursor solution comprising an organic solvent, 10% to 50%, by weight, of a dioxolane, and 2% to 5%, by weight, of a fluorinated organosilane having the formula: $R'R''_nSiX_{4-n}$, wherein n=0,1, or 2, and wherein R' is a polyfluorinated $C_1$-$C_8$ alkyl group having greater than or equal to 3 and less than or equal to 13 fluorine atoms, R" is H or a methyl group, and X is a methoxy group or a chlorine atom.

7. The electrochemical cell of claim 6 wherein the lithium metal layer comprises, by weight, greater than 97% lithium.

8. The electrochemical cell of claim 6 wherein the transition metal oxide of the positive electrode is a high-nickel content lithium nickel cobalt manganese oxide having the chemical formula: $LiNi_{1-a-b}CoaMn_bO_2$, wherein a=0.1-0.2 and b=0.1-0.2.

9. The electrochemical cell of claim 6 wherein the nonaqueous liquid electrolyte comprises a nonaqueous aprotic organic solvent and a lithium salt dissolved in the nonaqueous aprotic organic solvent.

10. The battery of claim 6 wherein the fluorinated organosilane comprises (3,3,3-trifluoropropylmethyl) dimethoxysilane, (3,3,3-Trifluoropropyl) trimethoxysilane, 1H,1H,2H,2H-perfluorooctylmethyldimethoxysilane, 1H,1H,2H,2H-perfluorooctyltrimethoxysilane, 1H, 1H,2H, 2H-perfluorooctyldimethylchlorosilane, 1H, 1H,2H,2H-perfluorooctylmethyldichlorosilane, (1H,1H,2H,2H-perfluoro-n-hexyl) methyldichlorosilane, and/or 1H, 1H,2H,2H-perfluorooctyltrichlorosilane.

11. The battery of claim 6 wherein the fluorinated organosilane comprises at least one fluorinated chlorosilane selected from the group consisting of 1H,1H,2H,2H-perfluorooctyldimethylchlorosilane; 1H,1H,2H,2H-perfluorooctylmethyldichlorosilane;

(1H,1H,2H,2H-perfluoro-n-hexyl) methyldichlorosilane; and 1H,1H,2H,2H-perfluorooctyltrichlorosilane.

12. The battery of claim 6 wherein R' is a polyfluorinated $C_3$-$C_6$ alkyl group having greater than or equal to 3 and less than or equal to 9 fluorine atoms.

13. The battery of claim 6 wherein the fluorinated organosilane comprises (3,3,3-trifluoropropylmethyl) dimethoxysilane and/or (3,3,3-Trifluoropropyl) trimethoxysilane.

14. The battery of claim 6 wherein the dioxolane comprises 4,5-diethyl-dioxolane; 4,5-dimethyl-dioxolane; 4-methyl-1,3-dioxolane; and/or 4-ethyl-1,3-dioxolane.

15. The battery of claim 6 wherein the protective interfacial layer has a porosity of about 60%.

* * * * *